Patented July 17, 1928.

1,677,701

UNITED STATES PATENT OFFICE.

WILLIAM H. ALTON, OF NEW YORK, N. Y., ASSIGNOR TO R. T. VANDERBILT COMPANY, INCORPORATED, OF NEW YORK, N. Y., A CORPORATION OF NEW YORK.

GRANULE AND METHOD OF PRODUCING SAME.

No Drawing.     Application filed December 9, 1927. Serial No. 239,001.

This invention relates to new granules and to an improved method of producing them.

The new granules are valuable for use for such purposes as the surfacing of asphalt shingles, in making rolled asphalt roofing, in making shingles of wood fiber compositions, or for application to other compositions such as rubber compositions, cement compositions, asbestos compositions, etc. The new granules are also valuable for decorative purposes, such as for applying to the surfaces of plastered walls, statuary, garden furniture or the like, while the plaster or cement surfaces are still sufficiently soft and unset to allow the granules to embed themselves and become permanently affixed thereto. The new granules are also valuable for use in forming garden walks and for florists' uses, such as the covering of surfaces of earth in flower pots in which flowers are planted, or for the embedding of plant or flower bulbs, and other similar purposes or for use in ponds and other water containers, such as fish ponds, etc.

In making asphalt roofing, shingles, etc., it is well known that the asphalt loses its life and becomes chalky and finally disintegrates when subjected to the action of the weather and particularly to the rays of sunlight. Accordingly it has been customary to apply slate granules to such asphalt surfaces to protect the surface of the asphalt from this direct exposure to the elements and to sunlight. Many slate granules are angular in their fracture and unsatisfactory for protecting asphalt; but those from the Peach Bottom district of the State of Pennsylvania are of a flat or laminated structure and overlap to protect the asphalt surface to which they are applied.

It has been proposed to use white quartzite and flint granules for surfacing asphalt, etc. and it has been proposed to color such granules before applying them. Such granules, however, are objectionable and not well adapted for extensive commercial application. Their extreme hardness and the short life of the linings of the mills in which they are formed by crushing or grinding makes them expensive; and they also form or tend to form natural lenses through which the rays of light pass and by which they are concentrated to a greater or less extent so as to have a burning or destroying or deteriorating effect on asphalt surfaces in which they are embedded. While such granules can be coated to form colored granules they still retain their angular fracture and round or granular shape which does not allow of their overlapping and which therefore is apt to leave voids or uncovered spaces between the angular contacts of the granules through which hot asphalt may exude at the time of application of the granules, or through which light may reach the asphalt directly after the granules are applied. Such exudation of the asphalt also tends to stain and discolor the face of the overlapping shingle when packed in bales or crates for shipment. Slate granules, except those from the Peach Bottom district of the State of Pennsylvania are also for the most part angular in their fracture and open to many of the objections above mentioned.

The present invention provides new vitreous granules of a flat or laminated structure which are free or relatively free from the objections above mentioned and which have advantages which make them valuable for use in forming granule surfaces on asphalt and for many other purposes. The new granules have the advantage that their flat or laminated structure permits their edges to overlap or to impinge upon one another in such a way as to substantially prevent the exudation of hot asphalt through voids between the granules at the time the granules are applied, and of protecting the asphalt from direct action of sunlight rays or changing weather conditions. The new granules are more comparable with the best slate granules produced from the Peach Bottom district of Pennsylvania, but have advantages over slate granules. The new granules can be produced of a white or light color or they can be coated various colors. They are opaque and vitreous and comparatively non-porous and non-absorptive, and have other advantages in their production and in their properties and uses.

The new granules are produced from soft rocks which are easily crushed, and the granules of the soft, crushed rock are thereafter hardened or tempered by subjecting them to a tempering or vitrifying heat. The soft rocks from which the new granules are produced are rocks which have a fibrous or laminated structure and which on subjecting to a tempering or vitrifying operation are converted into vitrified, opaque granules.

The crushing of the soft rock for the production of the unvitrified granules can be carried out much more cheaply and advantageously than the production of granules from flint or quartzite because the production of the soft rock granules eliminates the excessive wear of the grinding mills and the expensive steel linings of the grinding mills in which flint or quartzite is granulated, and in which a large amount of flint or quartzite is ground into particles too small for granule purposes.

The granules of the soft rock are not, however, in themselves particularly valuable for use in making granule surfaces. They are porous in character and become stained by the asphalt when applied to asphalt surfaces; and, if previously colored, such color is neutralized or overpowered by the asphalt stain.

I have found, however, that such porous granules of easily crushed rock, when made from fibrous or laminated rock, are converted into superior vitreous granules by subjecting the porous granules to a vitrifying temperature. This temperature is much higher than required for forming a glaze on the granules, and, when glazed granules are to be produced, I subject the porous granules to a vitrifying treatment at a higher temperature and subsequently subject the vitrified granules to the coating and glazing treatment.

In producing the new granules I take a soft rock of fibrous or laminated structure such as pyrophyllite sericite or steatite, which is soft and easily crushed, and crush the rock sufficiently to form granules of the desired size. These can be separated from the finer and coarser particles by suitable screens, leaving the finer particles for use for other purposes, while the coarser particles can be further crushed to form granules. By subjecting the rock to crushing and sizing as a preliminary operation, granules of the desired size can be produced which are then subjected, without admixture of finer particles or coarser particles, to the vitrifying treatment. The size of the granules can be varied, depending on the purposes for which they are to be used. For roofing purposes sizes between 10 and 35 mesh or between 20 and 35 mesh can be employed.

The vitrifying treatment can advantageously be carried out by heating the granules in a rotary kiln to a temperature which varies somewhat with the material treated. With pyrophyllite, for example, which is a valuable material for the purpose, the vitrifying operation can be conducted at a temperature of about 1370° C. For steatite a temperature of around 1290 to 1370° C. can be employed, and the same temperature for sericite. The vitrifying operation is continued until the porous granules are converted into comparatively vitreous granules which are comparatively non-porous and have vitrified surfaces or are comparatively vitreous and non-absorptive.

The carrying out of the vitrifying operation in a rotary kiln has the advantage that the operation can be made continuous, with continuous feed of the soft rock granules at one end and with regulation of the temperature so as to vitrify the granules to the required extent, and with discharge of the vitrified granules from the other end of the rotary kiln. Such kilns can be directly fired so that the granules will be gradually heated up to the vitrifying temperature and maintained there for a sufficient time to vitrify the granules to the required extent.

The resulting granules are tougher than slate and have the advantage that they are white or light in color. They are also opaque and are free from the disadvantages said to be inherent in crystal quartz of transmitting destructive light rays through the granules to the asphalt of asphalt surfaces to which the granules may be applied. The new granules can be used for producing white or light surfaces because, being opaque, they produce a deep white ground, being in this respect distinguished from other materials such as transparent or translucent quartz, glass, or other granules of transparent materials, which would permit the transmission of light rays therethrough and which would permit a black asphalt background, for example, to show through and thereby destroy the light color of transparent granules. The white or light granules can also be admixed with colored granules where a mixed color is desired. The new granules are free or practically so from sharp angles and differ materially from the irregular shapes of crushed vitreous material, such as crushed quartzite. They have in general a flat, rounded or irregular shape and when applied for example to an asphalt surface to produce roofing, they overlap each other in such a way that they give an improved coated surface which is an improvement over surfaces coated with the best grades of slate granules. The new granules, being flat, have a relatively high coverage and require a relatively much smaller weight of granules to give an effectively covered surface.

Granules produced from such materials as pyrophyllite are white or but slightly colored. They form a valuable granule base for the production of colored granules. Colored granules can be produced for example by applying to the granules a saturated solution of a suitable fluxing salt such as sodium borate or borax together with a coloring oxide (such as oxides of iron, cobalt, chromium, etc.) and heating the granules to a temperature around 1110 to 1170° C. or higher to form a glass-like coating. An advantageous method of coating the vitrified granules to produce colored granules having a glass-like colored surface is described in the application of Ira E. Sproat, Serial No. 86,660, but I do not limit myself to this particular method of applying the coating, since other suitable methods can be employed.

The coated granules like the uncoated granules have a flattened shape, are non-obsorptive, tougher than slate, and when applied, for example, in making roofing, they overlap much like shingles, being therefore much superior to the best grade of slate granules now employed for roofing purposes. They have the advantage over irregular granules with sharp corners, such as crushed quartzite, in that they cover the surface much better without voids of unprotected asphalt and are much smoother, being practically free from the sharp corners and edges of crushed quartzite.

The new granules, both in an uncolored state and in a colored state, form valuable granules for use in making roofing, stucco, etc., or for applying to other surfaces where a white or colored layer is desired.

I claim:—

1. The method of producing granules which comprises crushing soft non-vitreous rocks having a fibrous or laminated structure, separating particles of proper granule size from the crushed material and subjecting such granules to a vitrifying treatment to reduce the absorptive properties of the granules.

2. The method of producing granules which comprises crushing pyrophyllite, separating from the crushed pyrophyllite particles of granule size and subjecting such granules to a vitrifying treatment to reduce the absorptive properties of the granules.

3. The method of producing granules which comprises crushing a soft rock of fibrous or laminated structure to form particles of granule size, separating such granule particles from the crushed material, continuously feeding the granules to a rotary kiln, subjecting the granules therein to a vitrifying temperature to reduce the absorptive properties of such granules and continuously withdrawing such granules from the kiln.

4. The method of producing colored granules which comprises crushing a soft rock having a laminated or fibrous structure to produce therefrom flattened particles of granule size, separating the flattened granules from the crushed material, subjecting the crushed granules to a vitrifying treatment, and subsequently subjecting the vitrified granules to a coloring treatment by heating the granules with a material forming therewith a colored glaze to a sufficient temperature to result in the production of such glaze.

5. The method of producing colored granules which comprises crushing a white or substantially white soft rock having a fibrous or laminated structure to form flattened granule particles, separating the granule particles from the crushed material, heating the granules to a vitrifying temperature to produce flattened, vitrified granules of white or substantially white color and subjecting such granules to a coloring treatment by applying thereto a fluxing salt and a coloring oxide and heating the granules and applied coloring and fluxing material to a sufficient temperature to form a glass-like glaze.

6. The method of producing colored granules which comprises subjecting flat, non-vitreous granules of a silica-containing material to a vitrifying treatment to reduce the absorptive properties of such granules, applying to the vitrified granules a coloring glaze comprising a sodium salt and a coloring oxide and heating the granules and glazing material to a temperature above 1100° C. to form a glass-like colored surface on the granules.

7. The method of producing colored granules which comprises crushing pyrophyllite to form particles of granule size, separating such granule particles from the crushed material, heating the granules to a vitrifying temperature to reduce the absorptive properties of such granules, applying to the resulting vitrified granules a composition suitable for combining therewith to form a colored glaze and heating the granules and glazing material to a sufficient temperature to form a colored surface on the granules.

8. The method of producing colored granules which comprises crushing pyrophyllite to form particles of granule size, separating such granule particles from the crushed material, heating the granules to a vitrifying temperature to form vitrified granules, applying to the resulting vitrified granules a sodium salt such as borax and a coloring metal oxide and heating the granules and applied material to a temperature around 1110 to 1170° C. to form a colored glass-like coating on the granules.

9. New vitrified granules of low absorptive properties, of whitish color and of flattened shape, said granules being produced from relatively soft non-vitreous material and being practically free from the sharp angles of crushed vitreous materials, and having the property of overlapping when applied to plastic surfaces whereby a single adhering layer of the granules effectively covers the plastic surface.

10. New vitrified granules of low absorptive properties, of a whitish color and having a colored glass-like colored layer integrally combined therewith, said granules being of a flat, rounded or irregular shape and practically free from the sharp angles of crushed vitreous material, and having the property of overlapping when applied to plastic surfaces, whereby a single adhering layer of the granules effectively covers the plastic surface.

11. New vitrified granules of pyrophyllite.

12. New vitrified granules of pyrophyllite, said granules having a glass-like colored surface integrally united thereto.

In testimony whereof I affix my signature.

WILLIAM H. ALTON.